US008381851B2

(12) United States Patent
Gray, Jr.

(10) Patent No.: US 8,381,851 B2
(45) Date of Patent: *Feb. 26, 2013

(54) METHODS OF OPERATING A SERIES HYBRID VEHICLE

(75) Inventor: Charles L. Gray, Jr., Pinckney, MI (US)

(73) Assignee: The United States of America, as represented by the Administrator of the U.S. Environmental Protection Agency, Washington, DC (US)

( * ) Notice: Subject to any disclaimer, the term of this patent is extended or adjusted under 35 U.S.C. 154(b) by 7 days.

This patent is subject to a terminal disclaimer.

(21) Appl. No.: 12/955,795

(22) Filed: Nov. 29, 2010

(65) Prior Publication Data

US 2011/0071716 A1 Mar. 24, 2011

Related U.S. Application Data

(62) Division of application No. 11/058,690, filed on Feb. 14, 2005, now Pat. No. 7,857,082, which is a division of application No. 10/672,732, filed on Sep. 25, 2003, now Pat. No. 6,876,098.

(51) Int. Cl.
*B60K 6/46* (2007.10)

(52) U.S. Cl. ............................... 180/65.28; 180/65.245

(58) Field of Classification Search ................. 180/65.1, 180/65.21, 65.22, 65.245, 65.28, 65.31
See application file for complete search history.

(56) References Cited

U.S. PATENT DOCUMENTS

| | | | | |
|---|---|---|---|---|
| 3,842,287 A | 10/1974 | Nakamura | | 290/16 |
| 4,335,429 A | 6/1982 | Kawakatsu | | 364/424 |
| 4,351,405 A | 9/1982 | Fields et al. | | 180/65 A |
| 4,363,999 A | 12/1982 | Preikschat | | 318/53 |
| 4,407,132 A | 10/1983 | Kawakatsu et al. | | 60/716 |
| 4,493,221 A * | 1/1985 | Stieg et al. | | 474/14 |
| 4,547,678 A | 10/1985 | Metzner et al. | | 290/40 C |
| 4,638,228 A | 1/1987 | Junginger et al. | | 318/569 |
| 4,901,695 A | 2/1990 | Kabasin et al. | | 123/399 |
| 4,908,553 A | 3/1990 | Hoppie et al. | | 318/382 |
| 5,046,177 A * | 9/1991 | Vahabzadeh | | 701/54 |
| 5,081,365 A | 1/1992 | Field et al. | | 290/45 |
| 5,176,213 A | 1/1993 | Kawai et al. | | 180/243 |
| 5,291,960 A | 3/1994 | Brandenburg et al. | | 180/65.2 |
| 5,327,987 A | 7/1994 | Abdelmalek | | 180/65.2 |
| 5,358,317 A | 10/1994 | Cikanek | | 303/100 |
| 5,359,308 A | 10/1994 | Sun et al. | | 335/216 |
| 5,376,869 A | 12/1994 | Konrad | | 318/587 |
| 5,403,244 A | 4/1995 | Tankersley et al. | | 477/20 |

(Continued)

FOREIGN PATENT DOCUMENTS

| | | |
|---|---|---|
| DE | 20014160 U1 | 12/2001 |
| EP | 0543390 B1 | 5/1993 |
| EP | 1127733 B1 | 8/2001 |
| EP | 1211117 A1 | 6/2002 |
| JP | 05199609 | 8/1993 |
| JP | 07-284201 A | 10/1995 |
| JP | 07279702 | 10/1995 |
| JP | 07317581 | 12/1995 |

(Continued)

*Primary Examiner* — Frank Vanaman
(74) *Attorney, Agent, or Firm* — David H. Read

(57) ABSTRACT

A method for operating a series hybrid vehicle is provided, in which an engine generates secondary power that is either stored or used as direct input energy by a secondary power source to provide motive power to the vehicle. Regenerative braking is used to convert kinetic energy of the vehicle into secondary energy, which is also stored. When the vehicle driver makes a power demand, the secondary power source is powered by secondary energy from an energy storage device, direct input energy generated by the engine, or both, depending on the amount of stored secondary energy in combination with vehicle speed. When in use, the power level at which the engine is operated is also determined on the basis of available stored energy and vehicle speed. At higher vehicle speeds, the amount of stored energy is allowed to be depleted in order to increase the available storage capacity for regenerative braking.

12 Claims, 7 Drawing Sheets

U.S. PATENT DOCUMENTS

| | | | | |
|---|---|---|---|---|
| 5,406,126 | A | 4/1995 | Hadley et al. | 290/45 |
| 5,412,251 | A | 5/1995 | Furutani et al. | 290/16 |
| 5,450,324 | A | 9/1995 | Cikanek | 364/426.02 |
| 5,495,912 | A | 3/1996 | Gray, Jr. et al. | 180/165 |
| 5,511,859 | A | 4/1996 | Kade et al. | 303/3 |
| 5,549,087 | A | 8/1996 | Gray, Jr. et al. | 123/254 |
| 5,562,079 | A | 10/1996 | Gray, Jr. | 123/276 |
| 5,568,023 | A | 10/1996 | Grayer et al. | 318/139 |
| 5,579,640 | A | 12/1996 | Gray, Jr. et al. | 60/413 |
| 5,589,743 | A | 12/1996 | King | 318/139 |
| 5,608,308 | A | 3/1997 | Kiuchi et al. | 322/11 |
| 5,609,131 | A | 3/1997 | Gray, Jr. et al. | 123/299 |
| 5,611,300 | A | 3/1997 | Gray, Jr. | 123/48 A |
| 5,614,809 | A | 3/1997 | Kiuchi et al. | 322/11 |
| 5,617,823 | A | 4/1997 | Gray, Jr. et al. | 123/254 |
| 5,621,304 | A | 4/1997 | Kiuchi et al. | 322/18 |
| 5,659,240 | A | 8/1997 | King | 320/30 |
| 5,698,955 | A | 12/1997 | Nii | 318/139 |
| 5,707,115 | A | 1/1998 | Bodie et al. | 303/3 |
| 5,713,426 | A * | 2/1998 | Okamura | 180/65.245 |
| 5,725,064 | A | 3/1998 | Ibaraki et al. | 180/65.2 |
| 5,778,326 | A | 7/1998 | Moroto et al. | 701/22 |
| 5,786,640 | A | 7/1998 | Sakai et al. | 290/17 |
| 5,789,882 | A | 8/1998 | Ibaraki et al. | 318/148 |
| 5,791,427 | A | 8/1998 | Yamaguchi | 180/65.3 |
| 5,806,617 | A | 9/1998 | Yamaguchi | 180/65.2 |
| 5,818,116 | A | 10/1998 | Nakae et al. | 290/38 R |
| 5,842,534 | A | 12/1998 | Frank | 180/65.2 |
| 5,867,009 | A | 2/1999 | Kiuchi et al. | 322/16 |
| 5,881,559 | A | 3/1999 | Kawamura | 60/59.7 |
| 5,887,674 | A | 3/1999 | Gray, Jr. | 180/65.2 |
| 5,898,282 | A | 4/1999 | Drozdz et al. | 318/139 |
| 5,899,828 | A | 5/1999 | Yamazaki et al. | 477/4 |
| 5,905,360 | A | 5/1999 | Ukita | 320/118 |
| 5,915,489 | A | 6/1999 | Yamaguchi | 180/65.2 |
| 5,915,801 | A | 6/1999 | Taga et al. | 303/152 |
| 5,927,415 | A | 7/1999 | Ibaraki et al. | 180/65.2 |
| 5,939,794 | A | 8/1999 | Sakai et al. | 290/40 A |
| 5,951,614 | A | 9/1999 | Tabata et al. | 701/54 |
| 5,965,991 | A | 10/1999 | Koike et al. | 318/139 |
| 5,969,624 | A | 10/1999 | Sakai et al. | 340/636 |
| 5,984,033 | A | 11/1999 | Tamagawa et al. | 180/65.2 |
| 5,992,153 | A | 11/1999 | Tsuchihashi et al. | 60/716 |
| 6,026,921 | A | 2/2000 | Aoyama et al. | 180/65.2 |
| 6,054,844 | A | 4/2000 | Frank | 322/16 |
| 6,057,605 | A | 5/2000 | Bourne et al. | 290/40 C |
| 6,067,801 | A | 5/2000 | Harada et al. | 60/705 |
| 6,083,138 | A | 7/2000 | Aoyama et al. | 477/5 |
| 6,098,733 | A | 8/2000 | Ibaraki et al. | 180/65.2 |
| 6,109,237 | A | 8/2000 | Pels et al. | 123/339.19 |
| 6,116,363 | A | 9/2000 | Frank | 180/65.2 |
| 6,123,163 | A | 9/2000 | Otsu et al. | 180/65.8 |
| 6,131,538 | A | 10/2000 | Kanai | 123/2 |
| 6,137,250 | A | 10/2000 | Hirano et al. | 318/376 |
| 6,155,954 | A | 12/2000 | Itoyama et al. | 477/5 |
| 6,170,524 | B1 | 1/2001 | Gray, Jr. | 137/625.18 |
| 6,173,574 | B1 | 1/2001 | Obayashi et al. | 60/710 |
| 6,176,808 | B1 | 1/2001 | Brown et al. | 477/5 |
| 6,186,126 | B1 | 2/2001 | Gray, Jr. | 123/557 |
| 6,189,493 | B1 | 2/2001 | Gray, Jr. | 123/52.4 |
| 6,190,282 | B1 | 2/2001 | Deguchi et al. | 477/5 |
| 6,202,416 | B1 | 3/2001 | Gray, Jr. | 60/620 |
| 6,203,468 | B1 | 3/2001 | Nitta et al. | 477/5 |
| 6,215,198 | B1 | 4/2001 | Inada et al. | 290/40 C |
| 6,216,462 | B1 | 4/2001 | Gray, Jr. | 60/616 |
| 6,232,733 | B1 | 5/2001 | Obayashi et al. | 318/432 |
| 6,253,866 | B1 | 7/2001 | Kojima | 180/65.2 |
| 6,269,290 | B1 | 7/2001 | Egami et al. | 701/22 |
| 6,278,915 | B1 | 8/2001 | Deguchi et al. | 701/22 |
| 6,290,012 | B1 | 9/2001 | Matsubara et al. | 180/65.4 |
| 6,301,888 | B1 | 10/2001 | Gray, Jr. | 60/605.2 |
| 6,301,891 | B2 | 10/2001 | Gray, Jr. | 60/616 |
| 6,307,277 | B1 | 10/2001 | Tamai et al. | 290/40 C |
| 6,317,665 | B1 | 11/2001 | Tabata et al. | 701/22 |
| 6,318,486 | B2 | 11/2001 | Masaki | 180/65.2 |
| 6,318,487 | B2 | 11/2001 | Yanase et al. | 180/65.2 |
| 6,321,143 | B1 | 11/2001 | Phillips et al. | 701/22 |
| 6,321,144 | B1 | 11/2001 | Crombez | 701/22 |
| 6,326,702 | B1 | 12/2001 | Yonekura et al. | 290/40 C |
| 6,328,670 | B1 | 12/2001 | Minowa et al. | 477/5 |
| 6,329,775 | B1 | 12/2001 | Matsubara et al. | |
| 6,330,498 | B2 | 12/2001 | Tamagawa et al. | 701/22 |
| 6,334,079 | B1 | 12/2001 | Matsubara et al. | 701/22 |
| 6,335,574 | B1 | 1/2002 | Ochiai et al. | 290/406 |
| 6,343,252 | B1 | 1/2002 | Asami et al. | 701/113 |
| 6,344,732 | B2 | 2/2002 | Suzuki | |
| 6,345,216 | B1 | 2/2002 | Morimoto et al. | 701/22 |
| 6,346,064 | B1 | 2/2002 | Hada et al. | 477/171 |
| 6,351,698 | B1 | 2/2002 | Kubota et al. | 701/51 |
| 6,352,489 | B1 | 3/2002 | Kuroda et al. | 477/5 |
| 6,358,180 | B1 | 3/2002 | Kuroda et al. | 477/4 |
| 6,366,059 | B1 | 4/2002 | Wakashiro et al. | 322/16 |
| 6,367,570 | B1 | 4/2002 | Long, III et al. | 180/65.2 |
| 6,369,539 | B1 | 4/2002 | Morimoto et al. | 318/369 |
| 6,371,889 | B1 | 4/2002 | Kuroda et al. | 477/181 |
| 6,373,206 | B1 | 4/2002 | Morimoto et al. | 318/139 |
| 6,376,927 | B1 | 4/2002 | Tamai et al. | 290/40 C |
| 6,377,007 | B1 | 4/2002 | Ozaki et al. | 318/432 |
| 6,381,522 | B1 | 4/2002 | Watanabe et al. | 701/22 |
| 6,386,170 | B1 | 5/2002 | Iwano et al. | 123/196 R |
| 6,394,209 | B1 | 5/2002 | Goehring et al. | 180/65.4 |
| 6,405,121 | B2 | 6/2002 | Tamura et al. | 701/96 |
| 6,415,607 | B1 | 7/2002 | Gray, Jr. | 60/616 |
| 6,415,897 | B1 | 7/2002 | Sugimoto et al. | 188/353 |
| 6,429,613 | B2 | 8/2002 | Yanase et al. | 318/139 |
| 6,435,294 | B1 | 8/2002 | Hara et al. | 180/65.4 |
| 6,460,500 | B1 | 10/2002 | Ooyama et al. | 123/179.3 |
| 6,469,402 | B2 | 10/2002 | Morimoto et al. | 290/40 C |
| 6,473,683 | B1 | 10/2002 | Nada | 701/82 |
| 6,476,573 | B2 | 11/2002 | Omata et al. | 318/445 |
| 6,484,833 | B1 | 11/2002 | Chhaya et al. | 180/65.4 |
| 6,532,926 | B1 | 3/2003 | Kuroda et al. | 123/179.4 |
| 6,549,840 | B1 | 4/2003 | Mikami et al. | 701/69 |
| 6,621,175 | B1 | 9/2003 | Kuroda et al. | 290/40 D |
| 6,622,078 | B1 | 9/2003 | Kuragaki et al. | 701/96 |
| 6,622,804 | B2 | 9/2003 | Schmitz et al. | 180/65.2 |
| 6,624,529 | B2 | 9/2003 | Obayashi | 290/406 |
| 6,625,534 | B2 | 9/2003 | Suzuki et al. | 701/62 |
| 6,629,027 | B2 | 9/2003 | Yamaguchi et al. | 701/22 |
| 6,634,447 | B1 | 10/2003 | Matsubara et al. | 180/65.2 |
| 6,664,651 | B1 | 12/2003 | Kotre et al. | 290/29 |
| 6,724,165 | B2 | 4/2004 | Hughes | 318/376 |
| 6,724,300 | B2 | 4/2004 | Miyakoshi et al. | 340/435 |
| 6,742,487 | B2 | 6/2004 | Yamaguchi et al. | 123/179.3 |
| 6,765,306 | B2 | 7/2004 | Fattic | 290/40 C |
| 6,809,429 | B1 | 10/2004 | Frank | 290/40 C |
| 6,895,917 | B2 | 5/2005 | Itoh et al. | 123/179.4 |
| 6,898,506 | B2 | 5/2005 | Kawai et al. | 701/84 |
| 6,900,552 | B2 | 5/2005 | Fukano et al. | 290/40 C |
| 6,915,782 | B2 | 7/2005 | Hanada et al. | 123/399 |
| 6,930,405 | B2 | 8/2005 | Gunji | 290/40 C |
| 6,932,738 | B2 | 8/2005 | Aoki et al. | 477/5 |
| 6,934,610 | B2 | 8/2005 | Wakashiro et al. | 701/22 |
| 6,941,198 | B2 | 9/2005 | Brigham et al. | 701/22 |
| 6,943,460 | B2 | 9/2005 | Wakashiro et al. | 290/40 C |
| 6,998,727 | B2 | 2/2006 | Gray, Jr. | |
| 2002/0052677 | A1 | 5/2002 | Lasson et al. | 701/22 |
| 2002/0055411 | A1 | 5/2002 | Yoshiaki et al. | 477/107 |
| 2002/0065165 | A1 | 5/2002 | Lasson et al. | 477/3 |
| 2004/0178635 | A1 | 9/2004 | Gray, Jr. | 290/40 C |

FOREIGN PATENT DOCUMENTS

| | | | |
|---|---|---|---|
| JP | 0847109 | A | 2/1996 |
| JP | 8289407 | A | 11/1996 |
| JP | 9-56006 | A | 2/1997 |
| JP | 9070105 | | 3/1997 |
| JP | 9098515 | | 4/1997 |
| JP | 2000-45816 | A | 2/2000 |
| JP | 2001-54204 | A | 2/2001 |
| JP | 2001090572 | A | 4/2001 |
| JP | 2001-268719 | A | 9/2001 |
| JP | 2002-058111 | A | 2/2002 |
| JP | 2003070102 | | 3/2003 |
| WO | 0151870 | A1 | 7/2001 |
| WO | 0165100 | A2 | 9/2001 |

* cited by examiner

METHODS OF OPERATING A SERIES HYBRID VEHICLE

CROSS-REFERENCE TO RELATED APPLICATION

This application is a divisional of U.S. patent application Ser. No. 11/058,690, filed Feb. 14, 2005, which is a divisional of U.S. patent application Ser. No. 10/672,732, filed Sep. 25, 2003, which issued on Apr. 5, 2005, as U.S. Pat. No. 6,876,098, which applications are incorporated herein by reference in their entireties.

BACKGROUND OF THE INVENTION

1. Field of the Invention

The present invention relates generally to methods for operating a series hybrid vehicle and, more specifically, to methods for maximizing fuel efficiency while minimizing disruptions in drivability.

2. Description of the Related Art

The term "hybrid vehicle," in the broadest sense, denotes a vehicle having more than one power source and one or more energy storage means. The goal of a hybrid vehicle is to combine several similar or dissimilar types of energy stores and/or energy converters with different drive components, and operate each power source under varying operating conditions in a manner that results in greater overall energy savings than would otherwise be achieved through the use of a single power source.

The primary power source of a hybrid vehicle is usually an engine powered by fuel energy (primary energy), and the secondary power source is usually, but not limited to, one or more electric motors/generators powered by electric energy (a form of secondary energy) and/or one or more hydraulic motors/pumps powered by hydraulic pressure (also a form of secondary energy).

When the drive components of a hybrid vehicle allow the vehicle's primary and secondary power sources to both independently transmit power to the vehicle's wheels, the vehicle is commonly referred to as a parallel hybrid vehicle and the wheels of the vehicle can be driven solely by an engine (as is done with conventional vehicles), or solely by the secondary power source. In contrast, when the drive components of a hybrid vehicle are configured such that only the vehicle's secondary power source transmits power to the vehicle's wheels, the vehicle is commonly referred to as a series hybrid vehicle. In series hybrid vehicles, the engine is used to convert energy and provide power with which to power the secondary power source, but the engine is not mechanically linked to the vehicle's wheels.

To date, parallel hybrid vehicles have been more commercially successful than series hybrid vehicles. For example, the Insight, a hybrid vehicle manufactured by Honda Motor Company, and the Prius, a hybrid vehicle manufactured by Toyota Motor Corporation, represent the first two mass-marketed hybrids, and both are parallel hybrid vehicles.

The commercial success of parallel hybrid vehicles over series hybrids is, in large part, due to the state of technology and knowledge that have been available with respect to energy storage devices used for storing a hybrid vehicle's secondary energy. For example, many of the first generation secondary energy storage devices, such as early generation batteries, require a low charge rate in order to preserve the life of the energy storage device. This low charge rate requirement restricts the design choices available to a hybrid vehicle designer and, in particular, restricts the choices available for a series hybrid more than it restricts the choices available for a parallel hybrid. In series hybrid vehicles, the charge rate is, by definition, provided by an engine. Thus, design choices affecting the size and calibration of an engine in a series hybrid vehicle employing previous generation energy storage devices are limited by the need to have the engine of a series hybrid produce a low enough power level to generate the required low charge rate, while still achieving greater overall energy savings from the hybrid design than would otherwise be achieved through the use of a single power source.

Since engine efficiency is better at high loads than at low loads, engines in prior art series hybrid vehicles are typically very small, and are calibrated to operate at high loads. This allows the engine to operate closer to its maximum efficiency level while still producing a low enough power level to generate the required low charge rate. However, due to the low charge rate, the energy stored within previous generation energy storage devices is often used up more quickly than it can be replenished. Thus, when the energy stored within the energy storage device of a series hybrid vehicle is depleted, the driver is unable to complete a trip because the engine alone is too small to safely propel the vehicle.

As a result, there is a need for a new and improved method of operating a series hybrid vehicle.

BRIEF SUMMARY OF THE INVENTION

The invention is directed toward new and improved methods for operating a series hybrid vehicle in a manner designed to further the vehicle's overall energy efficiency gains.

According to principles of the present invention, when the driver of a series hybrid vehicle makes a demand for power output, a secondary power source(s) is supplied with, and thereby powered by, either (1) secondary energy stored in an energy storage device(s), (2) secondary energy generated by an engine(s) and used to directly supply power to the secondary power source, i.e., "direct input energy," or (3) both. The determination as to which selection is made depends on the amount of available secondary energy stored in the vehicle's secondary energy storage device(s) at a given vehicle speed, and in some cases depends also on the power level being demanded by the driver. If the engine is not generating secondary energy, the engine is either turned off or at idle. However, if the engine is generating secondary energy, the power/efficiency level at which the engine operates depends on the amount of available secondary energy stored in the vehicle's secondary storage device and the vehicle speed.

In one embodiment, a series hybrid vehicle is operated by selectively generating an amount of primary power from a primary power source, converting a first portion of the amount of primary power from the primary power source into an amount of direct input energy, and powering the secondary power source directly with the amount of direct input energy.

In another embodiment, a secondary power source in a series hybrid vehicle is operated by monitoring an amount of available stored energy within an energy storage device and operating an engine (1) at or near a first power level when the amount of available stored energy is within a predetermined upper range of available stored energy, (2) at or near a second power level when the amount of available stored energy is within a predetermined lower range of available stored energy, and (3) within a range of power levels when the amount of available stored energy is within a predetermined middle range of available stored energy. The values of thresholds that define the predetermined lower, middle, and upper ranges of available stored energy are selected, in part, on the basis of vehicle speed.

In another embodiment, a series hybrid vehicle is operated by monitoring vehicle speed and an amount of available stored energy within an energy storage device and, based on the amount of available stored energy at a given vehicle speed, selectively powering the secondary power source with either (1) a portion of the amount of available stored energy, (2) a portion of an amount of direct input energy, or (3) a combination of a portion of the amount of available stored energy and a portion of the amount of direct input energy.

BRIEF DESCRIPTION OF THE SEVERAL FIGURES

Figure 7A:
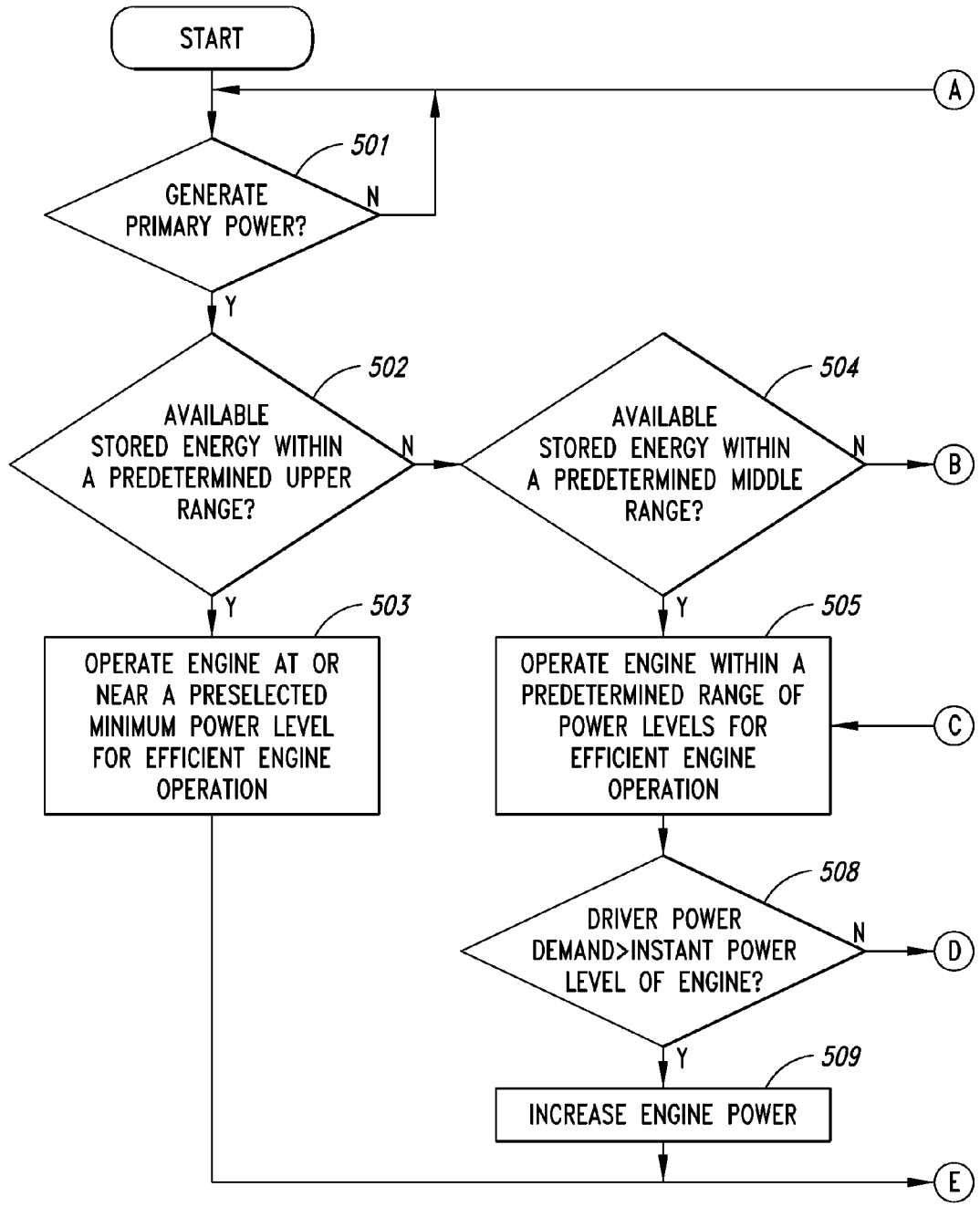
Figure 7B:
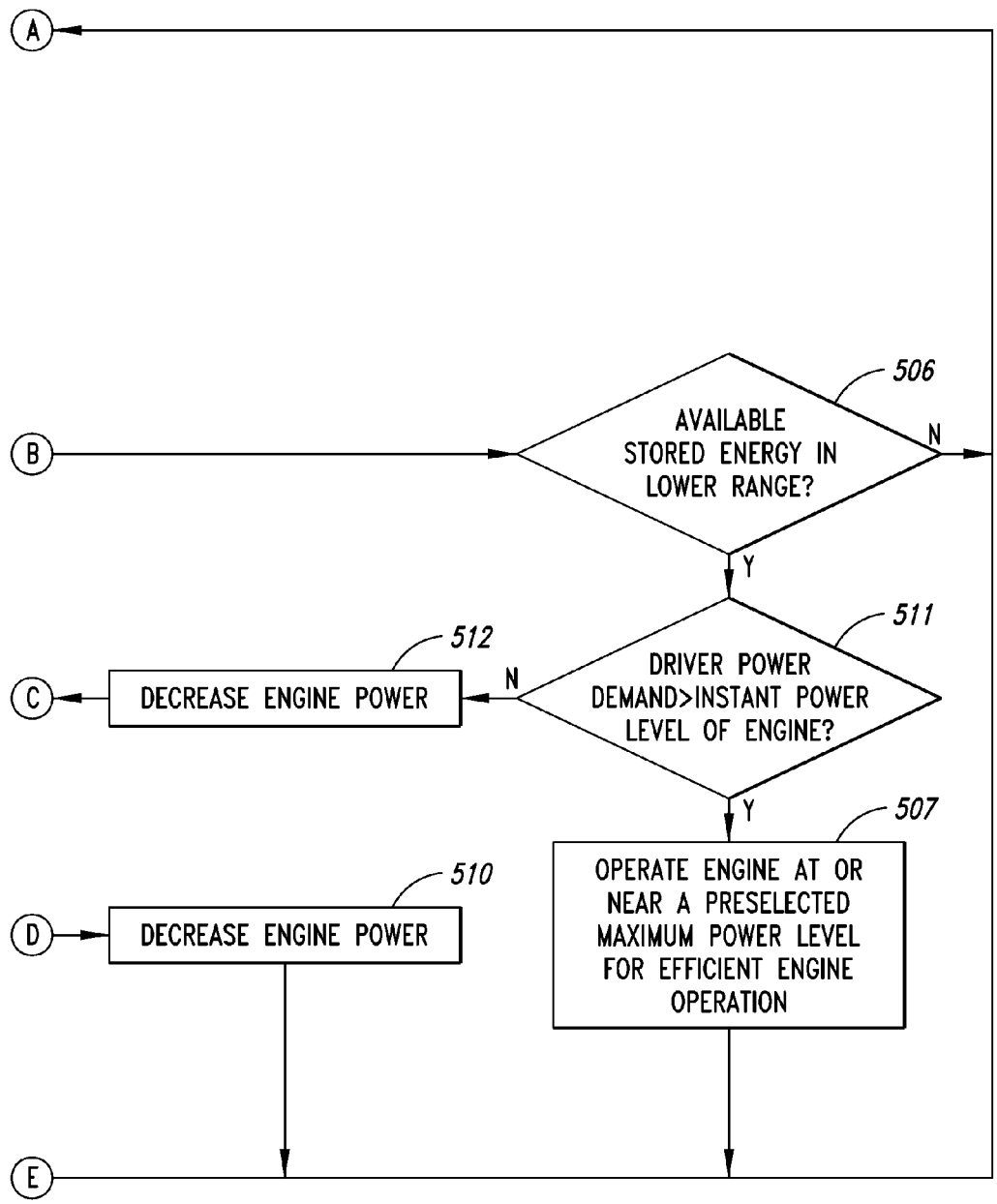

FIG. 7 (collectively shown as FIGS. 7A and 7B) is a logic flow diagram for controlling the operation of an engine in a series hybrid vehicle according to yet another embodiment of the present invention.

DETAILED DESCRIPTION OF THE INVENTION

In the following description, certain specific details are set forth in order to provide a thorough understanding of various embodiments of the invention. However, one of ordinary skill in the art will understand that the invention may be practiced without these details. In other instances, well-known structures associated with hybrid vehicles have not been shown or described in detail to avoid unnecessarily obscuring descriptions of the embodiments of the invention.

The term "primary power source," as used herein, denotes an engine such as an internal combustion engine (e.g., a compression ignition engine, a spark ignition engine, or gas turbine engine) or an external combustion engine (e.g., a Stirling engine), a fuel cell, or other primary energy converter.

The term "variable displacement engine," as used herein, refers to a multi-cylinder engine wherein each of the cylinders is selectively operated (individually or as a group) such that the engine's total displacement is thereby selectively increased or decreased.

The term "secondary power source," as used herein, denotes a power source having a two-way energy path and thus capable of capturing a vehicle's kinetic energy during the vehicle's braking process. A secondary power source may include, for example, one or more electric generator/motors or hydraulic pump/motors. As is to be understood by one of ordinary skill in the art, other like systems may also be employed, and the secondary pump/motors described herein do not limit the scope of the invention.

Depending on the type of secondary power system selected for use, the energy used to power the secondary power source, i.e., "secondary energy" may consist of electric energy, hydraulic energy, or any other form of energy that can be, at least in part, obtained from the vehicle's kinetic energy during the braking process, and reused to power a secondary power source.

The term "energy storage device," as used herein, denotes a system capable of receiving and storing the secondary energy, and allowing for its reuse to power a secondary power source. Such a system may, for example, consist of ultracapacitors, electric batteries, mechanical flywheels or hydraulic accumulators. As is to be understood by one of ordinary skill in the art, other like systems may also be employed, and the systems described herein do not limit the scope of the invention.

The term "available stored energy," as used herein, refers to all of the energy stored in an energy storage device, less any minimal amount which may be necessary to maintain the functionality of the storage device and/or less any amount used to supply energy to a device other than a secondary power source used to propel the vehicle.

The term "direct input energy," as used herein, refers to secondary energy generated by a primary power source and used to directly supply energy to a secondary power source, as opposed to storing the energy for use at a later time.

The term "storable energy," as used herein, refers to energy generated by a primary power source or a regenerative braking system and capable of being stored within an energy storage device to power a secondary power source at a later time.

Further, the terms "primary power source," "secondary power source," "engine," "energy storage device," "control processing unit," and other components of the present invention are, for ease of discussion, often referred to herein in the singular. However, as will be understood by one of ordinary skill in the art, the present invention may employ more than one of the components used to perform the functions of the present invention, and thus components referred to in the singular are not to be construed as limiting the number of components employed.

The headings provided herein are for convenience only and do not define or limit the scope or meaning of the claimed invention.

Applicability and General Overview

According to principles of the present invention, when the driver of a series hybrid vehicle 10 (FIG. 1) makes a demand for power output, a secondary power source(s) 12 is used to propel the vehicle. The secondary power source 12 is supplied with, and thereby powered by, either (1) an amount of available stored energy in an energy storage device(s) 14, (2) direct input energy generated by an engine(s) 16, or (3) both. The determination as to which selection is made depends on the amount of available stored energy stored within the vehicle's 10 energy storage device 14 as well as the kinetic energy present in the forward motion of the vehicle, a portion of which can potentially be recaptured through regenerative braking. When the engine 16 is used, the efficiency level at which the engine 16 operates depends on either (1) the amount of available secondary energy stored in the vehicle's 10 energy storage device 14 or (2) the vehicle's 10 speed and the amount of available secondary energy stored in the vehicle's 10 energy storage device 14.

Figure 1:
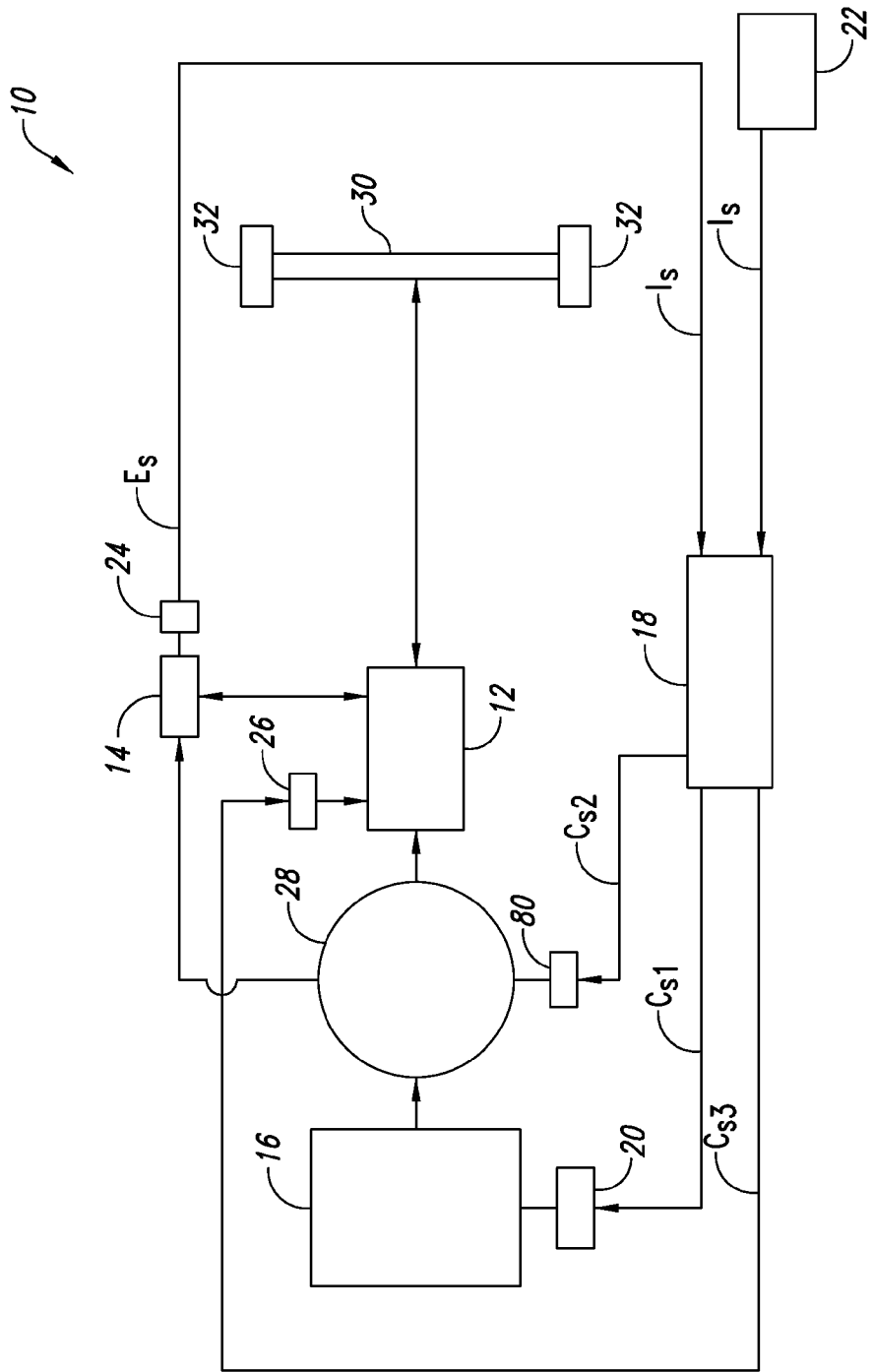
FIG. 1 is a schematic diagram of a series hybrid vehicle provided in accordance with the present invention.

As shown in FIG. 1, the secondary power source 12, for example a pump/motor, is coupled to the primary power source (engine) 16 via a generator 28, for example a pump/motor. When the engine 16 is operating, the generator 28 is used to convert the engine's 16 power into energy compatible for input into the secondary power source (e.g., electric current or pressurized hydraulic fluid). The converted energy is either supplied directly to the secondary power source 12 as direct input energy to power the secondary power source 12 as a motor, and/or supplied to the vehicle's energy storage device 14 and stored for later use (storable energy). As is to be understood by one of ordinary skill in the art, the type of generator 28 used necessarily depends on the type of energy required to operate the secondary power source 12. For example, if the secondary power source 12 is an electric generator/motor, then the generator 28 is an electric generator. Similarly, if the secondary power source 12 is a hydraulic pump/motor, then the generator 28 is a hydraulic pump. Generator 28 may also be used to start the engine 16 by acting as a motor using energy from energy storage device 14.

Fuel energy stored in a vehicle tank (not shown) is used to power the engine 16. An engine control device 20, coupled to the engine 16, and in communication with a CPU 18, controls fuel delivery to the engine 16. A generator control device 80, coupled to the generator 28, and in communication with CPU 18, controls the speed of engine 16 by varying load. Based on the amount of available stored energy and vehicle speed, the CPU 18 issues a command signal $C_{s1}$ to the engine control device 20 and a command signal $C_{s2}$ to the generator control device 80 to operate the engine 16 at a number of preselected power levels.

As is known to those of ordinary skill in the art, an engine 16 can be operated at a preselected power level by operating the engine at a preselected engine speed for a given engine torque value. As is further known to those of ordinary skill in the art, a desired engine torque can be achieved by increasing or decreasing the amount of fuel supplied to an engine 16. Thus, included among the many sensors (not all shown) which provide an input signal $I_s$ to the CPU 18 of the present invention, there are sensors which detect and monitor engine speed and engine torque. Other sensors detect the driver's command to brake the vehicle 10, the driver's command to power the vehicle 10, and monitor vehicle speed. For example, the driver's demand to power the vehicle is represented by throttle sensor 22.

Further, a secondary energy capacity sensor 24 monitors the amount of available stored energy at any given time and generates a signal $E_s$ representative of the energy detected. The CPU 18 also includes a memory for storing various lookup tables. Methods of monitoring an amount of available stored energy and issuing commands in response to detecting a predetermined amount of available energy in a hybrid vehicle are described in commonly assigned U.S. Pat. No. 6,998,727, filed Mar. 10, 2003, entitled "METHODS OF OPERATING A PARALLEL HYBRID VEHICLE HAVING AN INTERNAL COMBUSTION ENGINE AND A SECONDARY POWER SOURCE," which is incorporated herein by reference in its entirety.

A secondary power source control device 26 is coupled to the secondary power source 12 and used to control operation of the secondary power source 12. Thus, when a driver issues a command to power the vehicle 10, the CPU 18 detects this command and issues a command signal $C_{s3}$ directing the secondary power source control device 26 to operate the secondary power source 12 as a motor. When in motor mode, the secondary power source 12 transmits power through a mechanical linkage 30 to the vehicle's 10 wheels 32, and thereby propels the vehicle 10.

As mentioned above and explained in further detail below, when the engine 16 is operating, an amount of energy from the engine 16 is converted into an amount of storable energy and stored within the vehicle's energy storage device 14 when certain vehicle 10 operating parameters are met. However, as is known to those of ordinary skill in the art, storable energy can also be obtained by capturing some portion of the vehicle's kinetic energy during a braking event.

When a driver issues a command to brake the vehicle 10 and the amount of available energy stored within the energy storage device 14 is either below full capacity or below a preselected level, the CPU 18 directs the secondary power source control device 26 to operate the secondary power source 12 as a generator/pump. The vehicle's kinetic energy is then directed to the generator/pump 12, converted into an amount of storable energy, and stored within the vehicle's 10 energy storage device 14.

Determining How To Power The Secondary Power Source

Figure 2:
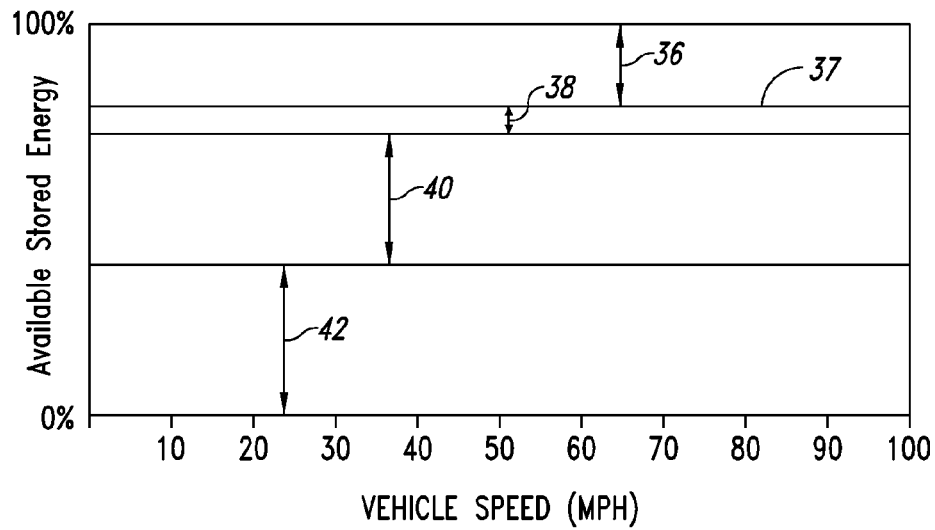
FIG. 2 is a graphic representation for controlling the operation of a series hybrid vehicle according to one embodiment of the present invention.
Figure 3:
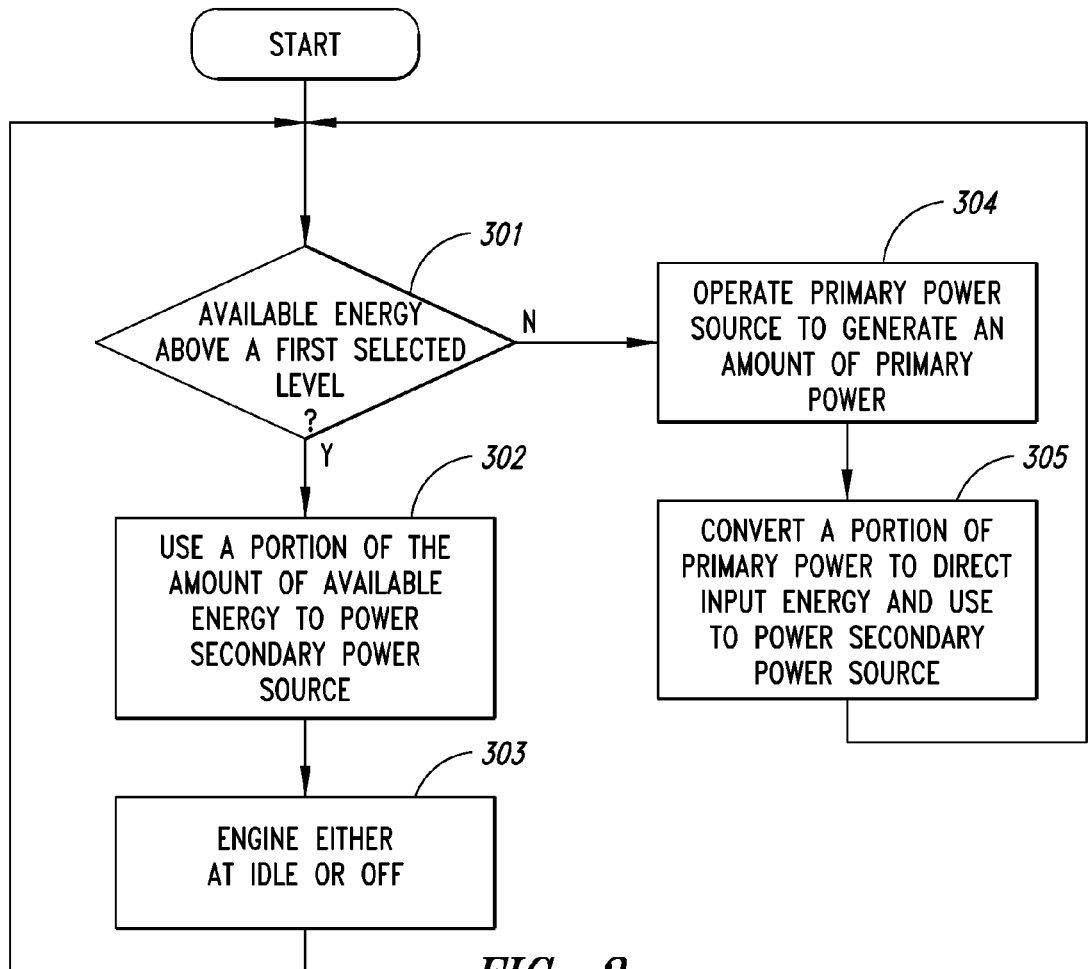
FIG. 3 is a logic flow diagram for controlling the operation of a series hybrid vehicle used in accordance with the embodiment provided in FIG. 2.

FIGS. 2 and 3 show one embodiment for supplying power to the secondary power source 12 in response to a demand to power the vehicle. In this embodiment, an amount of available stored energy within the vehicle's 10 energy storage device 14 is monitored and if the available stored energy is at or above a first selected level of available stored energy (depicted as line 37 in FIG. 2, and at step 301 in FIG. 3), the primary power source 16 does not supply energy to the secondary power source 12. Instead, a portion of the amount of the available stored energy is used to power the secondary power source 12 (step 302). During this time, the engine is either on and idling, or, alternatively, off (step 303). Determining whether to idle the engine 16 or to turn it off is a design choice, and both options provide certain advantages.

If it is desired to maximize the vehicle's 10 drivability, the engine 16 remains on and is at idle. This minimizes the driver's perception that the engine 16 is no longer generating energy and allows the engine 16 to quickly re-engage when needed. If it is desired to maximize the vehicle's 10 fuel efficiency, the engine 16 is turned off as soon as the available stored energy exceeds the first selected level (e.g., enters into range 36). However, if the engine 16 is turned off too quickly, there is a risk that customers will perceive that the vehicle is losing power. Thus, to maximize the vehicle's fuel efficiency and further minimize drivability disruptions, rather than turning the engine off when the available stored energy exceeds the first selected level, the engine is turned off when the available stored energy exceeds the first selected level and a command to decelerate the vehicle 10 is issued. This provides a more moderate approach that still results in fuel savings during the time the engine 16 is off, but synchronizes the timing of engine shut down with a driver issued command. In this way, the driver is able to logically relate to the sensation that the engine 16 is no longer generating power with a command that is intended to slow or coast the vehicle.

However, if the available stored energy is below the first selected level (depicted as line 37 in FIG. 2, and at step 301 in FIG. 3), then the engine 16 is operated to generate an amount of primary power (step 304), and the secondary power source is powered with a portion of direct input energy converted from the primary power source (step 305).

When primary power is generated and the amount of direct input energy is sufficient to meet a power demand, then direct input energy alone is used to power the secondary power source, and there is no need to use any of the available stored energy to power the secondary power source. When primary power is generated and the amount of direct input energy is not sufficient to meet a power demand, available stored energy may also be used, together with the amount of direct input energy, to augment the shortage.

However, in the event that the amount of available stored energy within the secondary energy storage device 14 is ever drawn to a level below a preselected "safety" level selected to indicate that the available stored energy is at or near depletion, it is preferred to discontinue use of any available stored energy. This is to preserve the life of the secondary energy storage device 14 and minimize performance problems that may result if the secondary energy storage device 14 is operated at too low of an energy level.

How the Primary Power Source Operates when Generating an Amount of Primary Power How the engine 16 is operated when generating an amount of primary power also depends on the amount of available energy within the energy storage device 14. The engine's 16 operation is discussed with continued reference to the exemplary embodiment shown in FIG. 2, reference to the exemplary power efficiency map shown in FIG. 4, and reference to the logic flow diagram shown in FIG. 5. As will be understood by one of ordinary skill in the art, the curved lines shown in FIG. 4 represent the percent efficiency at which a particular engine can be operated.

In accordance with one embodiment of the present invention, the engine is operated at different power levels depending on whether the available stored energy is within a predetermined upper range (see FIG. 2, range 38), a predetermined middle range (see FIG. 2, range 40), or a predetermined lower range (see FIG. 2, range 42).

Figure 4:
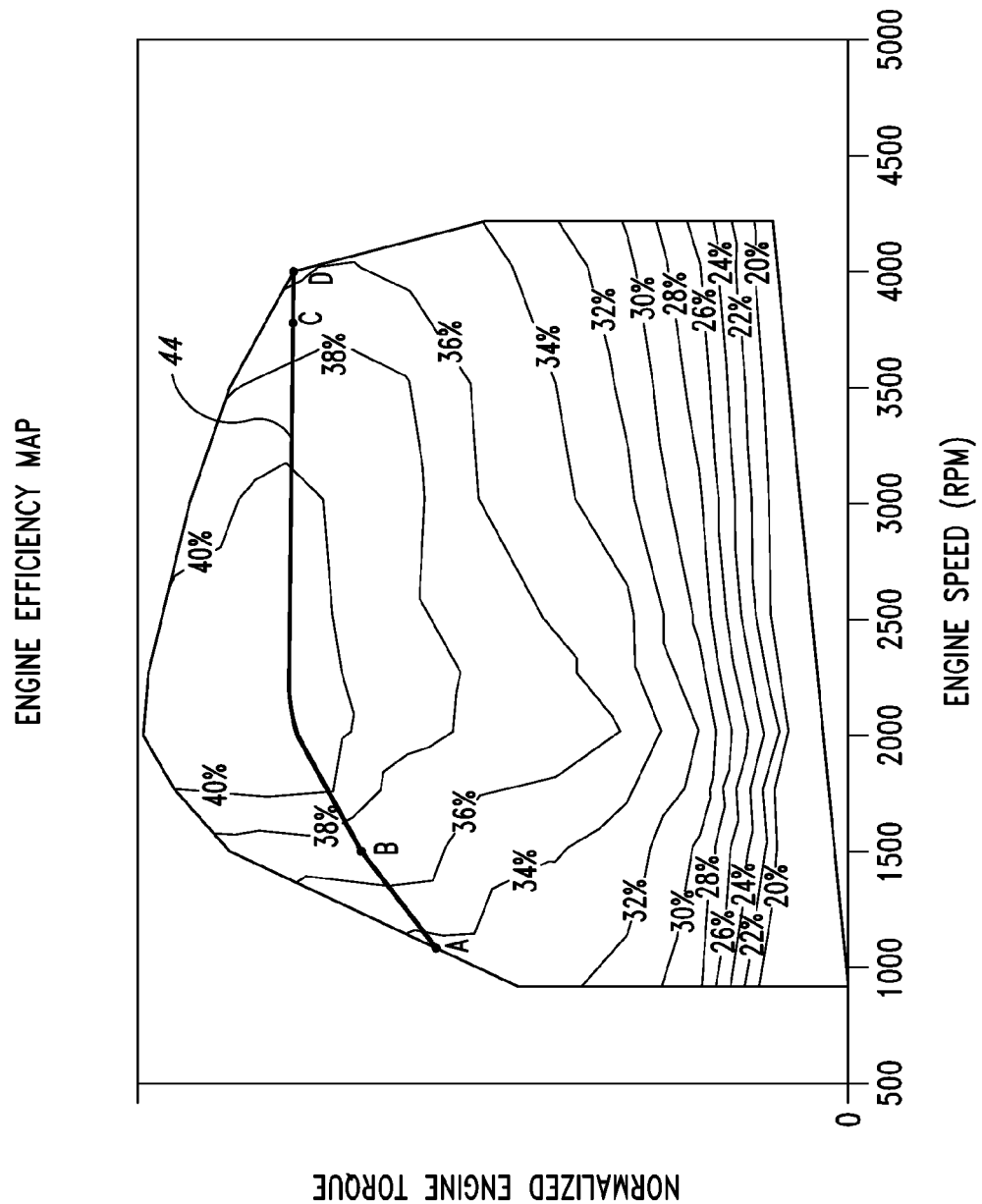
FIG. 4 is an exemplary power efficiency map for an engine in a series hybrid vehicle, showing exemplary target power points at which the engine is operated when used in accordance with the embodiment provided in FIG. 2.
Figure 5:
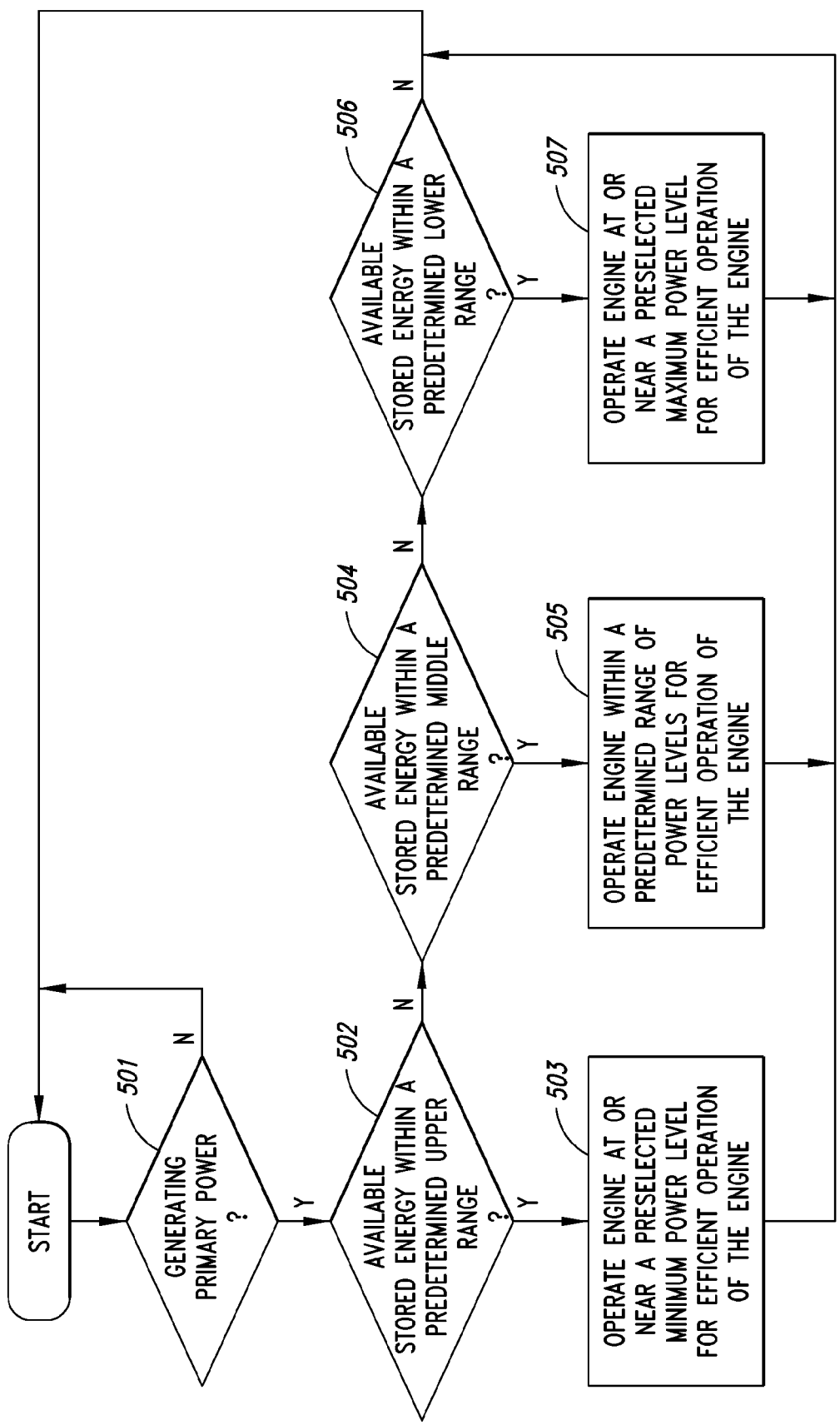
FIG. 5 is a logic flow diagram for controlling the operation of an engine in the series hybrid vehicle used in accordance with the embodiment provided in FIG. 2.

When the engine 16 generates primary power (FIG. 5, step 501) and the amount of available stored energy is within the predetermined upper range of available energy (e.g., below line 37 and within range 38 in FIG. 2, and at step 502 in FIG. 5), the engine is operated at or near a predefined minimum power level for efficient operation of the engine (FIG. 4, point A; FIG. 5, step 503). A first portion of the amount of primary power is converted into an amount of direct input energy and directly supplied to the secondary power source 12. Directly using the first portion of the amount of primary power, as opposed to first storing the first portion of the amount of primary power and then using it, as is done in many conventional series hybrid vehicles, serves to minimize energy transfer losses. As a result, greater energy efficiencies result.

In operating conditions where the direct input energy is not sufficient to power the secondary power source 12 and meet the driver's power demand, secondary energy stored within the vehicle's 10 energy storage device 14 is used to augment the required secondary energy. However, if the direct input energy is sufficient to meet the driver's power demand, the engine continues to be operated at or near its predefined minimum power level for efficient operation (FIG. 4, point A) and any additional power generated by the primary power source 16 is converted into an amount of storable energy for use at a later time—provided that secondary energy storage device 14 has sufficient capacity with which to store the amount of storable energy.

By purposefully having the engine 16 operate at or near its minimum power level for efficient operation (FIG. 4, point A) during the time the available stored energy is within the predetermined upper range 38 (FIG. 5, step 502), the primary power generated by the engine 16 is not likely to be sufficient to power the secondary power source to meet the driver's power demand. Therefore, it is more likely that available stored secondary energy will also be used. Thus, although the engine is operated at or near the engine's 16 predefined minimum power level for efficient operation (FIG. 4, point A), several advantages result.

First, using the vehicle's available stored energy creates an opportunity to use "free" energy, i.e., previously stored braking energy. Use of this "free" energy contributes to the overall energy efficiency of the vehicle. It also creates more space within the energy storage device 14 with which to capture more of the vehicle's 10 kinetic energy during the vehicle's next braking event. Second, using the vehicle's 10 available stored energy minimizes the likelihood that the available stored energy will, within a short time period, repeatedly operate above and below the first selected level of available stored energy for a given vehicle speed. If this were to happen, it could cause the engine 16 to rapidly cycle on and off and result in drivability issues. Third, using the vehicle's 10 available stored energy increases the likelihood that the available stored energy will drop to a level within the predetermined middle range 40 shown in FIG. 2.

When the available stored energy is within the predetermined middle range (e.g., within range 40 in FIG. 2 and at step 504 in FIG. 5), the engine 16 is operated at a range that is near a predefined range of power levels for efficient operation of the engine (e.g., between power levels B and C on torque/curve line 44 in FIG. 4 and at step 505 in FIG. 5). In one embodiment, the engine is operated within the predefined range of power levels, at a rate that is inversely proportional to the available stored energy within the predetermined middle range. For example, when the available stored energy is at a top most value selected to define the middle range of stored available energy 40, the engine is operated at a power level that is at or near the low end of its range of best power efficiency B, and when the available stored energy is at a bottom most value selected to define the middle range of stored available energy 40, the engine is operated at a power level that is at or near the high end of its range of best power efficiency C. Further, when available stored energy is at a value of equal distance between the top most and the bottom most value of the predetermined second range, the engine is operated at a power level that is near the midpoint of its range of best power efficiency. Operation of the engine at a range of power levels near the range of power levels B and C represents the power level at which the engine is likely to obtain its best operating efficiency. Thus, it is desirable to keep the vehicle operating within this predefined power range as much as possible.

One strategy for increasing the likelihood that the engine 16 will be operated within the desired predefined power range discussed above is to strive to maintain the amount of available energy within the energy storage device at a level that is within the predetermined middle range 40. Thus, in cases where the amount of available energy stored within the energy storage device 14 drops within the predetermined lower range of available energy (e.g., within range 42 in FIG. 2, and step 506 in FIG. 5), including at the lower limit, the engine 16 is operated at or near a predefined maximum power level for efficient operation of the engine (FIG. 4, point D and FIG. 5, step 507). This causes the engine 16 to produce more power, and increases the likelihood that the amount of power generated by the primary power source and converted into energy will exceed the amount of direct input energy required to power the secondary power source. When the amount of energy generated by the engine 16 exceeds the amount of energy needed to power the secondary power source 12, any excess energy is converted into storable energy and stored within the energy storage device. This serves to replenish the amount of available stored energy within the energy storage device and thereby increases the likelihood that the amount of available energy is once again within the desired predetermined middle range 40.

Figure 6:
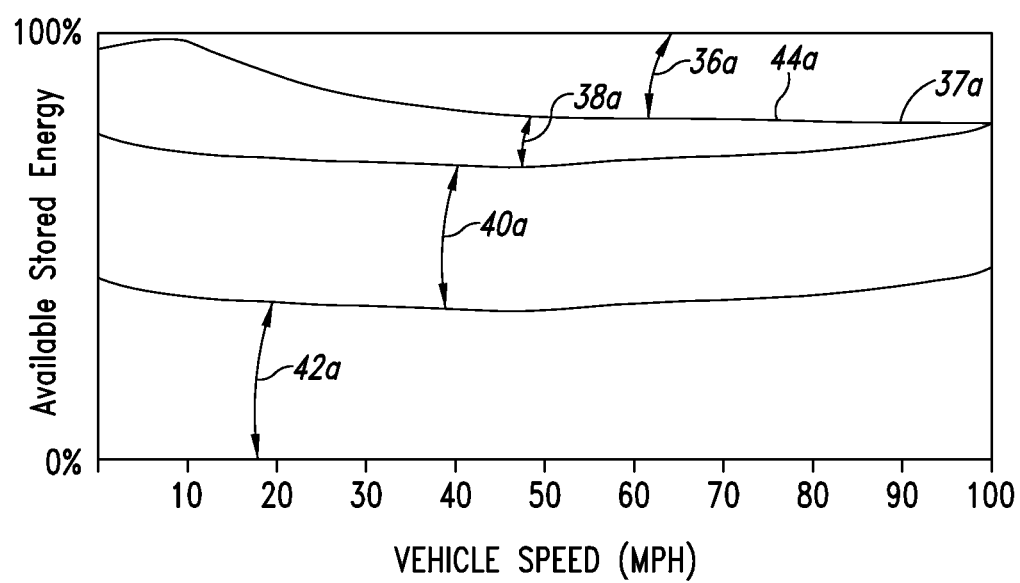
FIG. 6 is a graphic representation for controlling the operation of an engine in a series hybrid vehicle according to another embodiment of the present invention.

Under this strategy, even when the vehicle's power demand is not large, if the available stored energy level is within the lower range, the engine will nevertheless continue to be operated at or near its maximum efficient power level until the available stored energy level is restored to the middle range. According to another embodiment, described later in more detail, a hybrid vehicle is operated substantially as described above with reference to FIGS. 2 and 5, except that the lower, middle, and upper ranges of available energy are defined as shown in FIG. 6 rather than FIG. 2.

Because the engine must supply the vehicle's full power demand in the event the energy storage device has been depleted to the lower limit of the lower range, the engine is preferably sized to be able to meet such potentially necessary sustained vehicle power demands. For example, the engine preferably would be of sufficient size to enable the vehicle to ascend a long grade at acceptable speed when fully loaded. Although operation of the vehicle under a condition such as ascending a long grade occurs rarely, the ability to handle such conditions is nevertheless likely required for a vehicle to be commercially acceptable to the public. An engine that could provide at least 60% to 70% of the desired peak acceleration power level for the vehicle would likely be sufficient for this preferred capability. This preferred engine size in the present invention differs from prior art series hybrid systems, which instead utilized engines of smaller size.

As discussed previously, many first generation secondary energy storage devices, such as early generation batteries, required low charge rates in order to preserve the life of the energy storage device. As a result, in series hybrid vehicles (i.e. wherein the charge rate is provided by the engine), the engine would need to produce power levels sufficiently low to generate the required low charge rates for the energy storage device. However, use of an energy storage device that can charge at faster rates for sustained periods of time will allow efficient use of a larger engine in a series hybrid vehicle. It is therefore also preferable in the present invention to use an energy storage device that can charge efficiently at faster charge rates, which will therefore enable efficient use of a larger engine size, allowing the engine to run at a high rate of power while the secondary energy source rapidly stores energy, such as would be preferred for conditions where the available stored energy is within the lower range as set forth above. An example of an energy storage device with the current capability to sustain such higher charge rates as are preferred for the present invention is the high pressure hydraulic accumulator.

For additional drivability benefits, another preferred embodiment of the present invention also considers the power demanded by the vehicle driver in determining the power level to operate the engine, with additional reference to the logic flow diagram shown in FIG. 7. If the available stored energy is within a predetermined middle range (FIG. 2, range 40 and Step 504 in FIG. 7), the engine is still operated within a predetermined range of power levels for efficient operation (FIG. 4, points within B to C; Step 505 in FIG. 7), but the power level of the engine responds directionally (the rate of change is a calibration determination) to the power demanded by the vehicle driver (Step 508 of FIG. 7). If the driver power demand is greater than the instant power level of the engine, the engine power would be increased (Step 509); if lower, the engine power would be decreased (Step 510). If the available stored energy is within a predetermined lower range (FIG. 2, range 42, and Step 506 in FIG. 7), a determination is made whether the driver power demand is greater than the instant power level of the engine (Step 511). If the answer to Step 511 is yes, then the engine operates according to Step 507. If the answer to Step 511 is no, then the engine power level would be reduced (again the rate of change is a calibration determination) in Step 512, but the engine will still be constrained to operate within the power range of Step 505. An energy storage device that could efficiently sustain a charge rate matching 20% to 25% of the engine's maximum rated horsepower (or approximately point A in FIG. 4) would likely be sufficient for this preferred embodiment. This embodiment avoids the undesirable noise and feel to the driver of running the engine hard unnecessarily and out of synch with driver power demand. It also provides for more efficient engine use in the recharging of certain secondary energy storage devices.

As will be understood by those of ordinary skill in the art, the size of the secondary energy storage device will vary according to vehicle needs. Factors influencing the size of an energy storage device include, vehicle size, vehicle weight, vehicle speed, and the size of the primary and secondary power sources. Thus, although the present invention monitors available stored energy and performs certain functions according to the level of available stored energy within an energy storage device 14, the precise levels and ranges of available stored energy chosen as trigger points are a design choice determined by these factors. For example, larger energy storage devices 14 will allow the designer of a hybrid vehicle to use more of the vehicle's 10 available stored energy before reaching the threshold level of available stored energy which triggers the use of primary power, and when primary power is being used more of the operation (time) will occur within the desired predetermined middle range 40.

Optional Use of Additional Primary Power Sources

In an alternative embodiment, multiple engines are used. (As used here, "multiple engines" can also refer to a variable displacement engine with a first engine being the base displacement of the variable displacement engine and "additional engines" being the adding of increased displacement of the variable displacement engine.) For example, when the engine 16 is operated at or near the predefined maximum power level and the amount of primary power generated by the engine 16 and converted into energy does not exceed the amount of direct input energy required to power the secondary power source 12, additional engines (e.g., a total of two or more engines) may be used. Any additional engines may be operated at or near 1) a power level within a predefined range of power levels that is inversely proportional to the amount of available stored energy within the predetermined lower range (e.g., within range 42 in FIG. 2), or 2) a predefined maximum power level for efficient operation of the second engine.

Further use of additional engines (e.g., a total of two or more engines) may also be desirable when a first engine 16 is operated within the predetermined middle range of available stored energy (e.g., within range 40 in FIG. 2) and the power demanded by a user exceeds a predetermined level. This will lessen the likelihood that the amount of available stored energy will drop into the predetermined lower range of available stored energy 42, and increase the likelihood that the first engine 16 will continue to be operated within the predefined range for efficient operation of the engine 16.

Consideration of Kinetic Energy for Triggering Use of the Primary Power Source(s)

Each of the embodiments described above for determining when to use the primary power source, and how to operate the primary power source when it is used, is based on the amount of available stored energy. However, in another embodiment, similar to each of the embodiments discussed above, and illustrated in FIG. 6, rather than basing the determinations of when and how to generate primary power solely on the amount of available stored energy, these determinations are made based on the amount of available stored energy as a function of vehicle speed. For example, to determine whether to use primary power to power the secondary power source, both available stored energy and vehicle speed are monitored and, if the amount of available stored energy for a given vehicle speed is above a first selected level of available stored energy (depicted by the points comprising line 37a in FIG. 6), the secondary power source 12 is powered with available stored energy and not the primary power source 16. However, if the available stored energy for a given vehicle speed is below the first selected level (again depicted as line 37a in FIG. 6), then the engine 16 is used to generate primary power.

In this embodiment, how the engine 16 is operated when generating an amount of primary power also depends on the amount of available stored energy at a given vehicle speed. As with the embodiments described above, the engine is operated at either a minimum power level, a range of power levels, or a maximum power level, but its operation depends on whether the amount of available stored energy at a given vehicle speed is within a predetermined upper, middle or lower range, ranges 38a, 40a, and 42a, respectively.

Because kinetic energy of a vehicle is a function of the square of velocity, as vehicle speed increases, kinetic energy increases disproportionately, and at higher vehicle speeds can represent a significant source of storable secondary energy. Furthermore, it is more likely that a faster moving vehicle will be braked harder or longer than a slower moving vehicle, resulting in a greater opportunity to very quickly generate more storable energy. However, if the secondary energy storage device is already near capacity, a braking event that releases a large amount of kinetic energy can bring the storage device to full capacity using only a small portion of the total energy released, after which the remainder of the released energy will be dissipated by the friction brakes as heat. Therefore, as shown, for example, by line 37a of FIG. 6, the threshold at which the engine is engaged to begin generating secondary power is reduced as vehicle speed increases, which results in a reduction in the amount of stored secondary energy, and an increase in available storage capacity. Since it is more likely that the vehicle's braking energy at higher speeds will replenish the greater amount of stored energy consumed, a strategy of providing more capacity for storing braking energy at higher vehicle speeds furthers the vehicle's opportunity to capture "free" energy and provides another means of improving the vehicle's overall energy efficiency.

On the other hand, according to the embodiment shown in FIG. 6, if the amount of available stored energy is below the threshold represented by the line 37a, the power level at which the engine is operated does not always vary in inverse relation to vehicle speed, as might be expected from the discussion above. For example, it can be seen in FIG. 6 that the upper and lower thresholds that define the predetermined middle range 40a generally decline as vehicle speed increases up to around 50 mph, then trend upward again as vehicle speed continues to increase. This is to accommodate a number of factors that affect vehicle operation.

First is the recognition that a major braking event does not necessarily occur every time vehicle speed increases. Therefore, while it is desirable to provide additional storage capacity in order to exploit the available kinetic energy if a braking event does occur, it remains important to maintain a sufficient reserve of stored energy to avoid an overly depleted condition if no braking event occurs. Thus, while at higher vehicle speeds the engine will not be engaged until more of the stored energy is depleted, once the engine is engaged, the predetermined upper range of available stored energy 38a is narrowed, so that a small further decrease in the level of stored energy brings the level of stored energy into the middle range 40a, and the power level of the engine is increased accordingly, which will tend to maintain the amount of available stored energy at a higher average value.

Another factor in selecting the power setting of the engine is drag created by movement of the vehicle through air. Like kinetic energy, and according to well known physical principles, drag on a moving object increases according to the square of velocity. However, the power required to overcome that drag increases by the cube of the velocity. So, for example, as vehicle speed doubles, drag, i.e., "wind resistance," quadruples, and the power required to overcome the drag increases by a factor of eight. At low vehicle speeds, overcoming drag is a relatively small part of the total power required to propel a vehicle. At progressively higher vehicle speeds, the power required to move the vehicle a given distance, exclusive of drag, decreases, while drag becomes a progressively larger factor in power demand. With most passenger vehicles, at a speed near about 50 mph, overall energy efficiency reaches a maximum. Thus, at speeds below around 50 mph, the selected power level of the engine at a given level of available stored energy varies inversely with changes of vehicle speed, while at speeds above that value, the selected power level varies directly with changes of vehicle speed, to compensate for the increasing level of power consumed in driving the vehicle and to prevent excessive depletion of the available stored energy. Accordingly, as can be seen best in FIG. 6 one or more selected ranges of power levels 38a, 40a, and 42a of available stored energy may each have upper and/or lower threshold levels that vary disproportionately (i.e., in a nonlinear manner) in relation to changes in vehicle speed, whether directly or inversely in relation to changes in vehicle speed, as described. This relationship is shown on FIG. 6 by the thresholds (curved lines) between the ranges of power levels 38a, 40a, and 42a of available stored energy.

According to this embodiment, the threshold below which the engine is engaged to generate secondary energy is reduced in inverse relation with vehicle speed. Additionally, while the engine is in operation, the secondary power source is (1) powered with more of the available stored energy at cruising speeds at which power demand is minimal and kinetic energy is significant, and (2) less of the available stored energy at lower speeds where available kinetic energy is much lower, and also (3) less of the available stored energy at higher speeds where the power demand necessary to maintain vehicle speed increases. In short, for the purpose of determining whether, and at what power level to operate the engine, vehicle speed is considered as a factor with available stored energy. As will be understood by one of ordinary skill in the art, many of the methods may eliminate some steps, include other steps, and/or perform the steps in a different order than illustrated. For example, a predetermined level of available stored energy is a calibration design choice for the restarting of an engine that was shut off when the available stored energy exceeded a predetermined upper range. Further, the various embodiments described above can be combined to provide further embodiments.

The abstract of the present disclosure is provided as a brief outline of some of the principles of the invention according to one embodiment, and is not intended as a complete or definitive description of any embodiment thereof, nor should it be relied upon to define terms used in the specification or claims. The abstract does not limit the scope of the claims.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method of powering a secondary power source in a series hybrid vehicle, the method comprising:
monitoring an amount of available stored secondary energy within an energy storage device;
monitoring vehicle speed;
based on the amount of available stored energy at a given vehicle speed, selectively powering the secondary power source with either a portion of the amount of available stored energy or a portion of an amount of direct input energy, or with a combination of the portion of the amount of available stored energy and the portion of the amount of direct input energy, wherein selectively powering the secondary power source comprises disproportionately varying one or more of a plurality of selected thresholds of the available stored energy as a function of a change in vehicle speed;

operating an engine at a first selected power level when the amount of available stored secondary energy is within an upper range;

operating the engine at a second selected power level when the amount of available stored energy is within a lower range;

operating the engine at one of a range of selected power levels when the amount of available stored energy is within a middle range; and varying one or more of the plurality of thresholds further comprises defining the upper, the middle, and the lower ranges of available stored energy at least in part based on vehicle speed.

2. The method of claim 1 wherein the first selected power level is a predefined minimum power level for efficient operation of the engine, the second selected power level is a predefined maximum power level for efficient operation of the engine, and the power levels of the range of selected power levels are respective predefined power levels for efficient operation of the engine, each of which is greater than the first selected power level and lower than the second selected power level.

3. The method of claim 1 wherein each of the first selected power level, the second selected power level, and the power levels of the range of selected power levels is a respective preselected power level comprising a preselected engine speed and a preselected torque value.

4. The method of claim 1 wherein varying the one or more of the plurality of thresholds that define the upper, the middle, and the lower ranges of available stored secondary energy comprises varying the one or more thresholds in inverse relation to changes in vehicle speed while vehicle speed is below a selected value, and varying the one or more thresholds in direct relation to changes in vehicle speed while vehicle speed is above the selected value.

5. A method of operating a series hybrid vehicle, comprising:

using only secondary energy to provide motive power to the vehicle;

operating an engine to generate secondary energy when an amount of available stored secondary energy is below a first selected threshold;

monitoring vehicle speed;

selecting a value of the first selected threshold based on vehicle speed, and disproportionately and inversely varying the value of the first selected threshold in relation to changes in vehicle speed; and controlling an amount of the secondary energy drawn from the available stored secondary energy to provide motive power to the vehicle, as compared to an amount of the secondary energy provided as direct input energy generated by the engine, on the basis of the amount of available stored secondary energy at a given vehicle speed.

6. The method of claim 5 wherein controlling the amount comprises controlling the amount of available stored secondary energy used, relative to direct input energy, to increase as vehicle speed increases, up to a speed threshold, and to decrease as vehicle speed increases beyond the speed threshold.

7. A method of operating a series hybrid vehicle, comprising:

using only secondary energy to provide motive power to the vehicle;

operating an engine to generate secondary energy when an amount of available stored secondary energy is below a first selected threshold;

monitoring vehicle speed;

selecting a value of the first selected threshold based on vehicle speed, and disproportionately and inversely varying the value of the first selected threshold in relation to changes in vehicle speed; and controlling a power level at which the engine is operated based on the amount of available stored secondary energy, by selecting the power level based on the amount of available stored secondary energy at a given vehicle speed, operating the engine at one of a plurality of preselected power levels and selecting the one of the plurality of preselected power levels according to an inverse relationship with the amount of available stored secondary energy, wherein:

each of the plurality of preselected power levels lies within a predefined range for efficient operation of the engine;

the plurality of preselected power levels includes a predefined minimum power level for efficient operation of the engine;

the plurality of preselected power levels includes a predefined maximum power level for efficient operation of the engine; and the plurality of preselected power levels includes a range of predefined power levels for efficient operation of the engine that lie between the predefined minimum power level and the predefined maximum power level.

8. The method of claim 7 wherein controlling the power level comprises:

operating the engine at the predefined minimum power level when the amount of available stored secondary energy is below the first selected threshold and above a second selected threshold;

operating the engine at a power level within the range of predefined power levels when the amount of available stored secondary energy is below the second selected threshold and above a third selected threshold; and operating the engine at the predefined maximum power level when the amount of available stored secondary energy is below the third selected threshold;

the method further comprising selecting values of the second and the third selected thresholds based on vehicle speed.

9. The method of claim 8 wherein selecting the values of the second and the third selected thresholds comprises decreasing the respective values of the second and third thresholds as vehicle speed increases while vehicle speed is below a speed threshold, and increasing the respective values of the second and third thresholds as vehicle speed increases while vehicle speed is above the speed threshold.

10. A method of powering a secondary power source in a series hybrid vehicle, the method comprising:

monitoring an amount of available stored secondary energy within an energy storage device;

monitoring vehicle speed;

based on the amount of available stored energy at a given vehicle speed, selectively powering the secondary power source with either a portion of the amount of available stored energy or a portion of an amount of direct input energy, or with a combination of the portion of the amount of available stored energy and the portion of the amount of direct input energy;

operating an engine at a first selected power level when the amount of available stored secondary energy is within an upper range;

operating the engine at a second selected power level when the amount of available stored energy is within a lower range;

operating the engine at one of a range of selected power levels when the amount of available stored energy is within a middle range; and varying one or more of a plurality of thresholds that define the upper, the middle, and the lower ranges of available stored energy at least in part based on vehicle speed, wherein each of the first selected power level, the second selected power level, and the power levels of the range of selected power levels is a respective preselected power level comprising a preselected engine speed and a preselected torque value.

11. A method of operating a series hybrid vehicle, comprising:

using only secondary energy to provide motive power to the vehicle;

operating an engine to generate secondary energy when an amount of available stored secondary energy is below a first selected threshold;

monitoring vehicle speed;

selecting a value of the first selected threshold based on vehicle speed; and controlling an amount of the secondary energy drawn from the available stored secondary energy to provide motive power to the vehicle, as compared to an amount of the secondary energy provided as direct input energy generated by the engine, on the basis of the amount of available stored secondary energy at a given vehicle speed.

12. The method of claim 11 wherein controlling the amount comprises controlling the amount of available stored secondary energy used, relative to direct input energy, to increase as vehicle speed increases, up to a speed threshold, and to decrease as vehicle speed increases beyond the speed threshold.

* * * * *